Patented Sept. 19, 1933

1,927,662

UNITED STATES PATENT OFFICE 1,927,662

PROCESS OF REFINING IMPURE LEAD BULLION

James O. Johnstone, East Chicago, Ind., assignor to The Glidden Company, Cleveland, Ohio, a corporation of Ohio No Drawing. Application February 14, 1931
Serial No. 515,893

7 Claims. (Cl. 23—69)

This invention relates to a process for recovering lead from lead-bearing materials or alloys consisting for the most part of lead, but having a relatively small amount of other materials, such as antimony, arsenic, copper, bismuth, silver etc. Such an alloy may be the crude bullion resulting from the treatment of ores, or the metal resulting from the smelting of battery lead and miscellaneous lead-bearing materials. The purpose of the process is to obtain the lead in the form of substantially pure metallic lead, or substantially pure lead product, such as white lead, litharge, or red lead, or with only very slight amounts of other materials.

As an example of the procedure in treating a lead alloy according to my improved process, the metal is first oxidized, and preferably atomized, in any suitable manner such as by apparatus used in the manufacture of litharge from pure lead. It is advisable to leave some of the alloy unoxidized because, if any impurity gets into the solution it may be removed by agitating with powdered metallic lead and by leaving a small amount of metallic lead in the oxidized material the complete removal of the impurities will be ensured.

The oxidized material is then leached in a suitable leaching tank, with a solvent which will dissolve the lead oxide but which will leave the impurities substantially undissolved. One such solvent of suitable character for this purpose would be a more or less neutral solution of lead acetate. When this solution is used, the lead oxide goes into solution to form a basic lead acetate, and the impurities remain undissolved or as a slime.

The basic lead acetate solution, thus obtained, is then treated with carbon dioxide gas which may be in the form of purified flue gas or which may be derived from any other available source. This precipitates the lead as a white lead or a carbonate more or less basic. The treatment with the carbon dioxide gas is continued until the lead acetate solution is restored to a substantially neutral condition and the precipitate is then filtered off and the solution used again to treat a further portion of oxidized lead alloy.

When the final product that is desired is white lead, the flue gas must be scrubbed with water to remove sulphur and suspended matter. The degree of carbonation will be regulated so as to conform to accepted standards of composition.

The carbonated compounds thus obtained, as the precipitate or filter cake, may be converted to litharge or red lead by decomposition with heat by any of the well-known methods.

To obtain metallic pig lead, the filter cake may be fed to a blast furnace or any other suitable smelting furnace, and smelted according to existing approved practice. The gas from the blast furnace may be used as a source of carbon dioxide gas and when the product is to be made altogether into pig lead, it will not be necessary to scrub the gas before going to the carbonation apparatus. It is unnecessary to dry the filter cake before it is fed to the furnace and, when desired, the filter cake may be used as a source of material for other lead compounds.

A typical illustration of the practice of the process would be as follows:

The metal is melted and brought to a temperature of about 1000° F. It is vigorously agitated in a current of air, by which the oxide is carried into a settling chamber. There will also be carried over with it some free metal.

One ton of this oxidized metal is leached with 20 tons of solution containing 10% lead acetate. It is preferable to have the temperature of the solution over 100° F. The amount of insoluble residue will depend upon the amount of impurity present. The insoluble will be filtered off. The clear solution of basic acetate should then be treated with purified $CO_2$ gas.

Assuming that 80% of the weight of the oxidized metal goes into solution, and is reprecipitated as a basic carbonate, the amount of carbon as $CO_2$ that will be required to treat the solution from one ton of oxidized metal will be 58 pounds. However, the efficiency of absorption of $CO_2$ will probably be less than 50%.

Instead of using a lead acetate solution for leaching the oxidized material, lead nitrate may be used, or a mixture of the two. The slime and undissolved impurities resulting from the leaching operation may be treated by any suitable methods to recover the metals present therein, and the exact method of treatment will be largely determined by the composition of the slime and the impurities.

Having thus described my invention, I claim:

1. The steps of the hereindescribed process of recovering substantially pure lead compound, from an impure lead bullion containing other metals, which consist in first atomizing the bullion and oxidizing the major part thereof and leaving a small part thereof in the metallic state, then leaching the material thus formed with a solution which will dissolve the lead oxide but leave the other oxides contained in said material substantially undissolved, then removing the solids and slimes from said solution and treating the solution with carbon dioxide to form a precipitate of substantially pure lead carbonate and restore the leaching solution to its original condition, and filtering off said precipitate.

2. The steps of the hereindescribed process of recovering substantially pure lead compound, from an impure lead bullion containing other metals, which consist in first atomizing the bullion and oxidizing the major part thereof and leaving a small part thereof in the metallic state, then leaching the material thus formed with a solution which will dissolve the lead oxide but leave the other oxides contained in said material substantially undissolved, then removing the solids and slimes from said solution and treating the solution with carbon dioxide to form a precipitate of substantially pure lead carbonate and restore the leaching solution to its original condition, filtering off said precipitate and using the regenerated leaching solution to treat another quantity of said oxidized material.

3. The steps of the hereindescribed process of recovering substantially pure lead compound, from an impure lead bullion containing other metals, which consist in first oxidizing the major part of the bullion but leaving a small part unoxidized, then leaching the mixture of oxidized and unoxidized material thus formed with a solution which will dissolve the lead oxide but leave the other oxides as well as fine unoxidized lead and metallic impurities precipitated by the lead, contained in said material, substantially undissolved, then removing the solids and slimes from said solution and treating the solution with carbon dioxide to form a precipitate of substantially pure lead carbonate and regenerate the leaching solution, and filtering off said precipitates.

4. The steps of the hereindescribed process of recovering substantially pure lead compound, from an impure lead bullion containing other metals, which consist in first oxidizing the major part of the bullion but leaving a small part unoxidized, then leaching the mixture of oxidized and unoxidized material thus formed with a solution which will dissolve the lead oxide but leave the other oxides as well as fine unoxidized lead and metallic impurities precipitated by the lead, contained in said material, substantially undissolved, then removing the solids and slimes from said solution and treating the solution with carbon dioxide to form a precipitate of substantially pure lead carbonate and regenerate the leaching solution, filtering off said precipitate and using the regenerated leaching solution to treat another quantity of said mixture.

5. The steps of the hereindescribed process of recovering substantially pure lead compound, from an impure lead bullion containing other metals, which consist in first oxidizing the major part of the bullion and leaving a small part of the bullion unoxidized, then leaching the material thus formed with a substantially neutral lead acetate solution to dissolve the lead oxide and form a basic lead acetate solution, then removing the solids and slimes from said solution and treating the basic lead acetate solution with carbon dioxide to form a lead corbonate precipitate and restore the lead acetate solution to a substantially neutral condition, and then filtering off said precipitate and treating another quantity of said oxidized material with said filtered solution.

6. The steps of the hereindescribed process of recovering substantially pure lead compound, from an impure lead bullion containing other metals, which consist in first oxidizing the major part of the bullion and leaving a small part of the bullion unoxidized, then leaching the material thus formed with a substantially neutral lead acetate solution to dissolve the lead oxide and form a basic lead acetate solution, then removing the solids and slimes from said solution and treating the basic lead acetate solution with carbon dioxide to form a lead carbonate precipitate and restore the lead acetate solution to a substantially neutral condition, and filtering off said precipitate.

7. The steps of the hereindescribed process of recovering substantially pure lead compound, from an impure lead bullion containing other metals, which consist in first partially oxidizing the bullion to form a mixture of oxidized and unoxidized material, then leaching the said mixture with a substantially neutral lead nitrate solution to dissolve the lead oxide but leave the other oxides as well as fine unoxidized lead and metallic impurities precipitated by the lead and form a basic lead nitrate solution, then removing the solids and slimes from said solution and treating the basic lead nitrate solution with carbon dioxide to form a lead carbonate precipitate and restore the lead nitrate solution to a substantially neutral condition, and then filtering off said precipitate.

JAMES O. JOHNSTONE.